United States Patent
Unseld et al.

(10) Patent No.: US 6,644,669 B2
(45) Date of Patent: Nov. 11, 2003

(54) FLAT METAL GASKET

(75) Inventors: Gunther Unseld, Neenstetten (DE); Kurt Hohe, Langenau (DE)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/817,530

(22) Filed: Mar. 26, 2001

(65) Prior Publication Data

US 2001/0040347 A1 Nov. 15, 2001

(30) Foreign Application Priority Data

Mar. 29, 2000 (DE) .......................... 100 15 604

(51) Int. Cl.⁷ ............................... F02F 11/00
(52) U.S. Cl. ...................... 277/593; 277/594
(58) Field of Search ............... 277/590, 591, 277/592, 593, 594, 595, 597, 598

(56) References Cited

U.S. PATENT DOCUMENTS

| | | | | |
|---|---|---|---|---|
| 4,397,472 A | * | 8/1983 | Czernik | 277/592 |
| 5,205,566 A | * | 4/1993 | Ueta et al. | 277/596 |
| 5,522,604 A | * | 6/1996 | Weiss et al. | 277/594 |
| 5,695,200 A | * | 12/1997 | Diez et al. | 277/593 |
| 5,876,038 A | * | 3/1999 | Bohm et al. | 277/593 |
| 6,053,503 A | * | 4/2000 | Buck et al. | 277/592 |
| 6,113,110 A | * | 9/2000 | Hasegawa | 277/593 |
| 6,139,025 A | * | 10/2000 | Miyaoh | 277/593 |
| 6,145,847 A | * | 11/2000 | Maeda et al. | 277/593 |
| 6,186,513 B1 | * | 2/2001 | Udagawa | 277/592 |
| 6,328,314 B1 | * | 12/2001 | Jinno et al. | 277/593 |

FOREIGN PATENT DOCUMENTS

| | | |
|---|---|---|
| DE | 198 29 058 A1 | 6/1998 |
| EP | 0 937 924 A1 | 8/1999 |
| EP | 0 939 256 A1 | 9/1999 |

OTHER PUBLICATIONS

PCT International Serach Report No. WO 98/28559 issued Jul. 2, 1998 together with English translation of Abstract.
English Derwent translation of Abstract for DE 19829058.

* cited by examiner

Primary Examiner—Anthony Knight
Assistant Examiner—Vishal Patel
(74) Attorney, Agent, or Firm—Rader, Fishman & Grauer PLLC

(57) ABSTRACT

A metal gasket is proposed, especially a cylinder head gasket for a combustion engine, which comprises a sealing plate having a combustion chamber through-hole, a deformation-limiting device lying adjacent to the combustion chamber through-hole and respectively one top and one bottom layer. The deformation-limiting device is configured as a symmetrical bead in relation to the top and bottom layers. A protrusion preferably provided with a radius is orientated towards one of the top and bottom layers and opposite thereto a depression facing the other of the top and bottom layers is provided which is surrounded by two raised portions projecting opposite the surface of the sealing plate. A filling is accommodated in the depression.

12 Claims, 1 Drawing Sheet

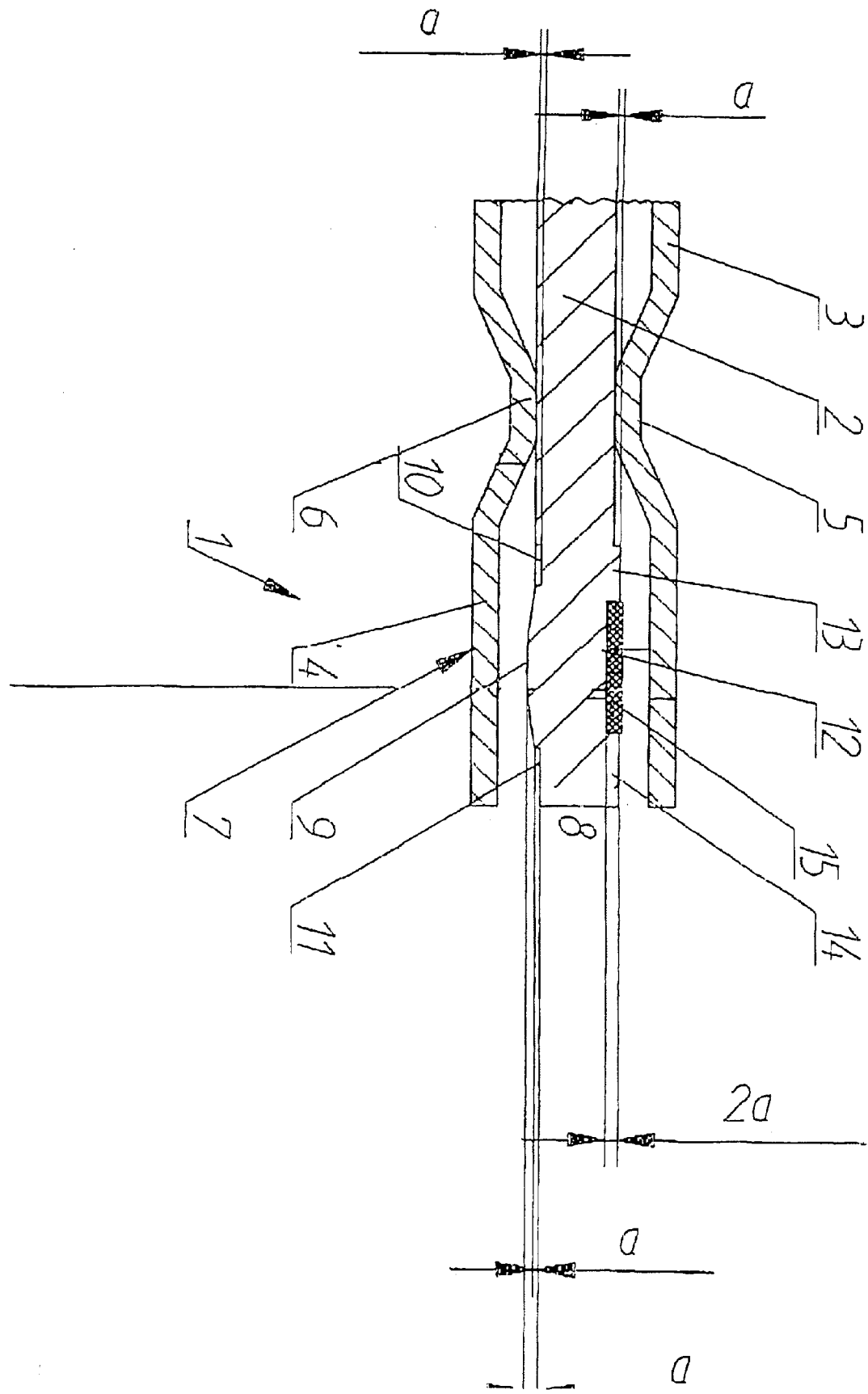

FLAT METAL GASKET

The invention relates to a metal gasket, in particular a cylinder head gasket for a combustion engine with a sealing plate having a combustion chamber through-hole, and with a deformation-limiting device lying adjacent to the combustion chamber through-hole and a top and bottom layer.

In DE 42 19 709 A1 are described metal gaskets in various embodiments. One of the disclosed gaskets contains a deformation-limiting device which is formed as the crimping-over of an annular portion of the sealing plate at the combustion chamber through-hole. During the crimping process, a part of the annular portion which has a reduced material thickness by comparison with the sealing plate, is laid round over itself so that the deformation-limiting device is formed by a doubling of the reduced material thickness.

If a sealing plate provided in this way with a deformation-limiting device or stopper is used as the middle layer between two cover plates with beads, and the three-layer seal thus formed is pressed together, the pressing forces are transferred in an uneven manner, such that the load alleviation of the cover plates is uneven.

Asymmetrical beads filled with a resin or the like are also generally known (see U.S. Pat. No. 5,582,415).

In EP 0 747 614 A1 is disclosed a metal cylinder head gasket which has two outer cover plates with beads and a support plate disposed between same, which are provided with one or more combustion chamber through-holes. Adjacent to the beads of the cover plates is provided a deformation-limiting device around the combustion chamber through-hole at the supporting plate, which device is provided with rounded portions on the surfaces facing the cover plates.

The object underlying the invention is to create a metal gasket of this type, which with a simple set-up applies uniform pressure and has improved, adaptable deformation behaviour.

This object is achieved according to the invention by the characterising features of the main claim in conjunction with the features of the preamble.

Because the deformation-limiting device is configured as a bead which is symmetrical in respect of the top and bottom layers, in such a way that a protrusion is oriented towards one of the layers and lying opposite a depression facing the other of the two layers is provided, which is surrounded by two raised portions protruding opposite the surface of the sealing plate, a filling being accommodated in the depression, the stopper which is usually provided in prior art can be dispensed with or the stopper layer is replaced by the symmetrical bead. Furthermore, uniform compression is possible and the bottom and top layers are uniformly relieved of pressure. Through the special shape of the bead in conjunction with the filling, it adapts to the engine topography during fitting, being adjustable in compression to a preset degree.

Through the measures quoted in the subordinate claims, advantageous developments and improvements are possible.

It is particularly advantageous that the protrusion of the bead is provided with a radius or a convexity, by which means the surface pressure can be increased. By predetermining the amount of the filling in the depression or respectively the width and height of the filling and/or through the size of the radius, which can change after pressing into a straight line, deliberate pressure control can be undertaken and the adaptation to the engine can be set, by which means its dynamics and the sealing gap oscillations can be reduced.

Altogether the symmetry of the bead produces a uniform distribution of the force from the beads of the bottom and top plates.

One embodiment of the invention is represented in the FIGURE and is described in greater detail in the following description. The sole FIGURE shows a section through a gasket according to the invention.

The metal gasket 1, partially represented in the FIGURE and which in this embodiment is a cylinder head gasket of a combustion engine, has a sealing plate 2 with a top layer or a cover plate 3 and a bottom layer or a bottom plate 4. The cover and bottom plates 3, 4, which are generally produced from a spring steel, are each provided with a bead 5, 6. A bead 7 acting as a deformation-limiting device in the sealing plate 2 is disposed adjacent to a combustion chamber through-hole 8, which surrounds the combustion chamber 8.

The bead has a protrusion 9 facing the bottom plate 4 with a radius or a bead convexity, the height of which, extending from the surface of the sealing plate 2 to the apex of the protrusion 9, is referred to as a. The embodiment represented shows the gasket in the uncompressed state. In relation to the surface of the sealing plate 2, the protrusion 9 is surrounded by two recessed counterbored holes 10, 11 or respectively delimited by same, which preferably have a depth of a in respect of the surface of the sealing plate 2.

Opposite the protrusion 9, a depression 12 is formed in the surface of the sealing plate 2, the depression 12 being enclosed by two raised portions 13, 14 which project opposite the surface of the sealing plate 2 and the height of which has the dimension a in respect of the surface of the sealing plate. The depression 12, which preferably has a depth of $2a$, is completely or partially filled with a projecting filling 15 which is designated as a "hard coating" and which consists of a thermosetting plastic and/or thermoplastic material, interspersed with filling material. This filling 11 largely prevents compression of the depression 12 during deformation into a seal and provides an additional attenuation of the deformation behaviour of the bead 7. In another embodiment, the filling can also be configured as a metal film or the like.

Bead 7 is produced by compression moulding in a mould, displacement of the material of the sealing plate taking place as a result of the protrusions and depressions of the bead 7. The filling 15, the height and width of which is adjustable, can be produced in a screen printing process or be applied with a dispenser.

A filling configured as a metal film can e.g. be hot-pressed in.

The adaptation of the gasket 1 to the engine topography during fitting can be deliberately set by the radius of the protrusion 9 and by the level of filling, i.e. by the height and width of the filling 15, the radius being able to change into a straight line during fitting.

The bead 7 is designated as symmetrical since the height of the raised portions 13, 14 is substantially equal to the height of the protrusion 9. Through the symmetry of the bead 7, during fitting there is even distribution of the force of the beads 5 and 6 of the cover and bottom plates 3, 4. Naturally the cover plate 3 can be replaced by a bottom plate 4 and the other way round, or a plurality of top and bottom layers can be provided.

What is claimed is:

1. A metal gasket for use in a combustion engine, said gasket including a sealing plate having at least one combustion chamber through-hole, a deformation limiting device positioned adjacent the combustion chamber through-hole, at least one top layer and at least one bottom layer, the improvement comprising:

the deformation limiting device being configured as a bead that is generally symmetrical with respect to the top and bottom layers;

a protrusion on the sealing plate oriented towards one of the top or bottom layers, said protrusion projecting outward relative to a surface of the sealing plate a predetermined height;

a depression formed in the surface of the sealing plate opposite said protrusion and facing the other one of the top or bottom layers, said depression being delimited by two raised portions projecting outward from the surface of the sealing plate a predetermined height; and a filling received in said depression.

2. The gasket according to claim 1, wherein said protrusion is provided with a radius.

3. The gasket according to claim 2, wherein the height of said protrusion is approximately the same as the height of said raised portions that delimit said depression.

4. The gasket according to claim 2, wherein said protrusion is delimited by two counterbore holes recessed in the surface of the sealing plate.

5. The gasket according to claim 1, wherein the amount of said filling in said depression is proportional to the desired level of deformation.

6. The gasket according to claim 1, wherein the level of deformation can be adjusted by adjusting the radius of said protrusion.

7. The gasket according to claim 1, wherein said filling is a thermosetting plastic.

8. The gasket according to claim 1, wherein said filling is a thermoplastic.

9. The gasket according to claim 1, wherein said filling is a mixture of thermosetting plastic and thermoplastic.

10. The gasket according to claim 1, wherein said filling is metal foil.

11. A metal gasket for use in a combustion engine, said gasket comprising:

a sealing plate having at least one combustion chamber through-hole;

a deformation-limiting device positioned adjacent said combustion chamber through-hole and configured as a bead;

at least one top layer and at least one bottom layer; and wherein said bead includes protrusion on said sealing plate that is oriented towards one of said top or bottom layers, said protrusion projecting outward from a surface of the sealing plate a predetermined height; a depression formed in said surface of said sealing plate opposite said protrusion said depression being delimited by two raised portions projecting outward from the surface of said sealing plate a predetermined height, and a filling received in said depression.

12. A metal gasket for use in a combustion engine, said gasket comprising:

a sealing plate having at least one combustion chamber through-hole;

a deformation-limiting device positioned adjacent said combustion chamber through-hole and configured as a bead;

at least one top layer and at least one bottom layer; and wherein said bead is symmetrical with respect to said top and bottom layer and includes a protrusion on said sealing plate that oriented towards one of said top or bottom layers, said protrusion projecting outward from a surface of said sealing plate a predetermined height and having a radius that is delimited by two counterbore holes recessed in the surface of said sealing plate, a depression is formed in said surface of said sealing plate opposite said protrusion, said depression being delimited by two raised portions projecting outward from the surface of said sealing plate a predetermined height, and a filling received in said depression, said filling being either thermosetting plastic or thermoplastic or a mixture of thermosetting plastic and thermoplastic.

\* \* \* \* \*